(12) United States Patent
Hussain et al.

(10) Patent No.: US 7,990,106 B2
(45) Date of Patent: Aug. 2, 2011

(54) BATTERY CHARGING SYSTEMS AND METHODS WITH ADJUSTABLE CURRENT LIMIT

(75) Inventors: M. Abid Hussain, Los Altos, CA (US);
George Konstantinos Paparrizos, Foster City, CA (US); Takashi Kanamori, San Jose, CA (US); Thomas J. O'Brien, Powell, OH (US)

(73) Assignee: Summit Microelectronics, Inc., Sunnyvale, CA (US)

( * ) Notice: Subject to any disclaimer, the term of this patent is extended or adjusted under 35 U.S.C. 154(b) by 541 days.

(21) Appl. No.: 12/106,575

(22) Filed: Apr. 21, 2008

(65) Prior Publication Data

US 2008/0258688 A1 Oct. 23, 2008

Related U.S. Application Data

(60) Provisional application No. 60/925,375, filed on Apr. 19, 2007.

(51) Int. Cl.
*H02J 7/00* (2006.01)
(52) U.S. Cl. ........ 320/128; 320/148; 320/160; 320/162; 323/282; 323/299
(58) Field of Classification Search .................. 320/128; 323/204, 299
See application file for complete search history.

(56) References Cited

U.S. PATENT DOCUMENTS

| | | | |
|---|---|---|---|
| 4,667,143 A | | 5/1987 | Cooper et al. |
| 5,625,275 A | * | 4/1997 | Tanikawa et al. ............ 320/160 |
| 5,923,158 A | * | 7/1999 | Kurokami et al. ............ 323/299 |
| 5,982,151 A | * | 11/1999 | Nagai et al. .................... 320/141 |
| 6,144,187 A | | 11/2000 | Bryson |
| 6,690,277 B1 | * | 2/2004 | Hansen et al. ............. 340/568.2 |
| 6,849,837 B2 | * | 2/2005 | Riess et al. ..................... 219/634 |
| 6,967,469 B2 | | 11/2005 | Yamamoto et al. |
| 7,161,393 B1 | * | 1/2007 | Potanin et al. ................. 327/108 |
| 7,372,240 B2 | * | 5/2008 | Khayat et al. ................. 323/283 |
| 7,433,211 B1 | * | 10/2008 | Collmeyer et al. ........ 363/21.13 |
| 7,486,056 B2 | * | 2/2009 | Shuey ............................. 323/266 |
| 7,834,591 B2 | * | 11/2010 | Hussain et al. ............... 320/137 |
| 2001/0000212 A1 | | 4/2001 | Reipur et al. |
| 2002/0031001 A1 | * | 3/2002 | Harvest ............................ 363/89 |
| 2002/0084798 A1 | * | 7/2002 | Osburn et al. ................. 324/765 |
| 2003/0124427 A1 | * | 7/2003 | Takeuchi et al. .............. 429/245 |
| 2004/0150265 A1 | * | 8/2004 | Gotzenberger ................. 307/11 |

(Continued)

OTHER PUBLICATIONS

International Search Report (from a corresponding foreign application), PCT/US08/61016, mailed Aug. 7, 2008.

(Continued)

*Primary Examiner* — Edward Tso
*Assistant Examiner* — Arun Williams
(74) *Attorney, Agent, or Firm* — Chad R. Walsh; Fountainhead Law Group PC (57) ABSTRACT

Embodiments of the present invention include techniques for charging a battery using a regulator. In one embodiment, the present invention includes an electronic circuit comprising a regulator having an input coupled to a power source for receiving a voltage and a current and an output for providing an output current, an input voltage detection circuit coupled to the power source, and an adjustable current limit circuit for controlling the input or output current of the regulator, wherein input voltage detection circuit monitors the voltage from the power source and the adjustable current limit circuit changes the input or output current of the regulator to optimize the power drawn from power source.

38 Claims, 5 Drawing Sheets

U.S. PATENT DOCUMENTS

| | | | |
|---|---|---|---|
| 2005/0046391 A1 | 3/2005 | Veselic et al. | |
| 2005/0152123 A1* | 7/2005 | Voreis et al. | 362/3 |
| 2006/0181244 A1 | 8/2006 | Luo et al. | |
| 2006/0273776 A1* | 12/2006 | Smart et al. | 323/304 |
| 2007/0007939 A1* | 1/2007 | Miller et al. | 323/299 |
| 2007/0080670 A1* | 4/2007 | Galinski, III | 323/273 |
| 2007/0096705 A1* | 5/2007 | Chen | 323/282 |
| 2007/0182672 A1* | 8/2007 | Hoppenbrouwers et al. | 345/76 |
| 2007/0200542 A1* | 8/2007 | Lee et al. | 323/304 |
| 2007/0212580 A1* | 9/2007 | Seo et al. | 429/22 |
| 2007/0290668 A1* | 12/2007 | Chou et al. | 323/299 |
| 2008/0111521 A1* | 5/2008 | So et al. | 320/137 |
| 2008/0197825 A1* | 8/2008 | Siri | 323/272 |

OTHER PUBLICATIONS

Texas Instruments, "Dynamic Power-Path Management and Dynamic Power Management," Application Report SLUA400 Jan. 2007.

* cited by examiner

BATTERY CHARGING SYSTEMS AND METHODS WITH ADJUSTABLE CURRENT LIMIT

RELATED APPLICATIONS

This invention relates to and claims priority from U.S. Provisional Patent Application No. 60/925,375, filed Apr. 19, 2007.

BACKGROUND

The present invention relates to battery chargers, and in particular, to battery charging systems and methods with adjustable current limiting.

Batteries have long been used as a source of power for mobile electronic devices. Batteries provide energy in the form of electric currents and voltages that allow circuits to operate. However, the amount of energy stored in a battery, is limited, and batteries lose power when the electronic devices are in use. When a battery's energy supply becomes depleted, the battery's voltage will start to fall from its rated voltage, and the electronic device relying on the battery for power will no longer operate properly. Such thresholds will be different for different types of electronic devices.

Many types of batteries are designed for a single use. Such batteries are discarded after the charge is depleted. However, some batteries are designed to be rechargeable. Rechargeable batteries typically require some form of battery charging system. Typical battery charging systems transfer power from a power source, such as an AC wall plug, into the battery. The recharging process typically includes processing and conditioning voltages and currents from the power source so that the voltages and currents supplied to the battery meet the particular battery's charging specifications. For example, if the voltages or currents supplied to the battery are too large, the battery can be damaged or even explode. On the other hand, if the voltages or currents supplied to the battery are too small, the charging process can be very, inefficient or altogether ineffective. Inefficient use of the battery's charging specification can lead to very long charging times, for example. Additionally. If the charging process is not carried out efficiently, the battery's cell capacity (i.e., the amount of energy the battery can hold may not be optimized.

The type of power source is another important aspect of battery charging. For example, some power sources may provide AC voltages and currents, and other power sources may provide DC voltages and currents. One problem associated with charging a battery pertains to transforming the voltages and currents available at the power source into voltages and currents that may be used to charge a battery. Existing battery chargers are typically static systems. Battery charger circuits are typically hardwired to receive power from a particular source and provide voltages and currents to a particular battery based on the battery's charge specification. However, the inflexibility of existing chargers results in many of the inefficiencies and problems described above. It would be very advantageous to have battery charging systems and methods that were more flexible than existing systems or even adaptable to particular battery technologies, or the changing battery charging environment.

Thus, there is a need for improved battery charger systems and methods that improve the battery charging process. The present invention solves these and other problems by providing battery charging system and methods with adjustable current limit.

SUMMARY

Embodiments of the present invention include techniques for charging a battery using a regulator. For example, power sources from DC power systems, such as USB hosts or hubs, or AC to DC power systems such as wall adapters may provide an input voltage and current. Embodiments of the present invention monitor the input voltage and limit the current used by the system so that the total power drawn by the system does not exceed the maximum voltage and current that can be generated by the power source. In one embodiment, the current limit is reprogrammed until the voltage from the power source collapses. In one embodiment, a regulator is coupled to the input voltage from the power source and the input or output current of the regulator is controlled so that the voltage and current from the power source is does not exceed rated values of the power source. The regulator may, be used to charge a battery, for example, and may be a switching regulator or a linear regulator.

In one embodiment, the present invention includes an electronic circuit comprising a regulator having an input coupled to a power source for receiving a voltage and a current and an output for providing an output current, an input voltage detection circuit coupled to the power source, and an adjustable current limit circuit for controlling the input or output current of the regulator, wherein input voltage detection circuit monitors the voltage from the power source and the adjustable current limit circuit changes the input or output current of the regulator if the voltage from the power source is below a threshold value.

In another embodiment, the present invention includes a method of controlling current in an electronic circuit comprising receiving a voltage and current from a power source, monitoring the voltage from the power source, and changing an input or output current of the regulator if the voltage from the power source is below a threshold value.

The following detailed description and accompanying drawings provide a better understanding of the nature and advantages of the present invention.

DETAILED DESCRIPTION

Described herein are techniques for battery charging systems and methods. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
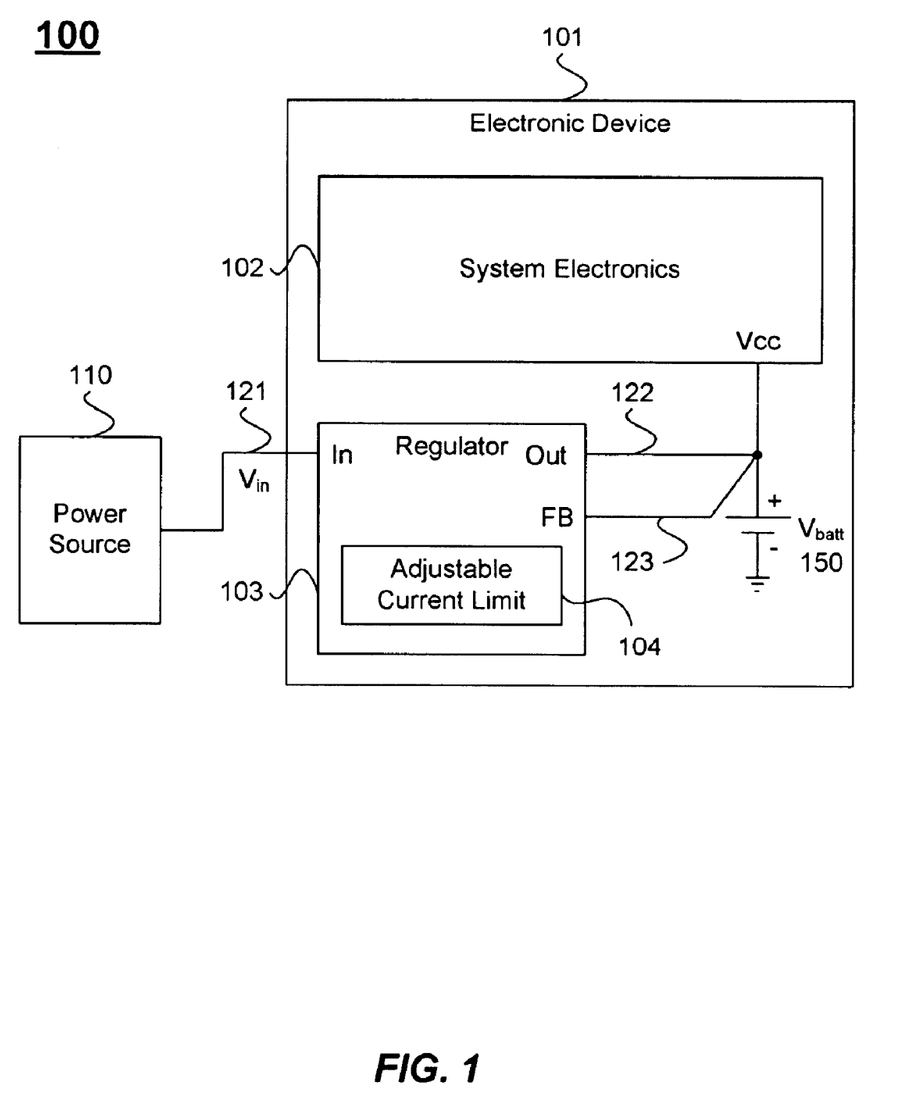
FIG. 1 illustrates an electronic device including a battery charger according to one embodiment of the present invention.

FIG. 1 illustrates an electronic device including a battery charger according to one embodiment of the present invention. Electronic device 101 includes system electronics 102, a battery 150, and a regulator 103 including circuitry for charging the battery. System electronics may include microprocessors, microcontrollers, wireless electronics, network electronics, or a variety of other analog or digital electrical circuits that may be powered by battery 150. The electronic device may be a portable phone (e.g., a cellular phone), a personal digital assistant ("PDA"), a portable music or video player, or a variety of other portable devices that may be powered by a battery. Regulator 103 may include an input terminal 121 coupled to a power source 110 and an output terminal 122 coupled to a battery 150 for charging the battery. Regulator 103 may include a feedback terminal 123 for regulating voltage or current. Example regulators are linear regulators or switching regulators, for example. Switching regulators may further include filters coupled between the regulator output and the battery, for example. Embodiments of the present invention improve battery charging by providing adjustable current limiting 104. In this example, regulator 103 may include storage for holding a current limit value. As described in more detail below, a stored programmable current limit value may be changed to change the current into or out of the regulator. In some embodiments, input current limiting may be implemented. Alternatively, in other embodiments, output current limiting mal, be implemented. While embodiments of the invention may be described showing the regulator and charging circuits on the electronic device, it is to be understood that the regulator and charging circuits described herein may be external to the electronic device (e.g., part of the AC to DC wall adapter or as a separate component that couples to the electronic device).

For example, a Universal Serial Bus ("USB") is an example of a DC power source that may, be used to charge a battery. USB typically includes a power supply voltage, Vin, which may be connected to electronic device 101, for example. The voltage and current from the USB power source may be coupled through regulator 103 to power the system electronics 102, or charge the battery 150, or both. However, different power sources, such as USB, may have different power ratings. For example, some USB power sources are designed to provide 5 volts and a maximum of 500 mA. Other USB power sources are designed to provide 5 volts and a maximum of 100 mA. More generally, a power source capable of plugging into a wall power supply may transform the AC voltage and current into DC voltage and current and provide a variety of different DC voltages and currents that may be used to power device 10 or charge battery 150. One example unit is a AC to DC converter that receives AC voltages and currents and outputs a USB voltage, such as 5 volts, and some current. One particular problem with these power sources is that the current available may be different depending on the manufacturer, and if regulator 103 draws more current than the power source can supply, then the voltage of the power source will start to drop (i.e., the power source will collapse). For example, wall adapters providing a USB compatible output may provide 300 mA, while other USB compatible wall adapters may provide 1500 mA or more. It is to be understood that the AD to DC power source could be a USB compatible or another AC to DC power source.

Embodiments of the present invention detect the input voltage from a power source, and change the current received from the power source so that the maximum power (voltage multiplied with current) does not exceed the maximum power available from the power source. For example, in one embodiment, a current limit is programmed to an initial value, and the input voltage from a power source is detected (i.e., sensed). The current limit may be a current in the regulator that is set to an initial value. For instance, an input current limit in a switching regulator may be an input current value. If the input current reaches a programmed input current limit value, then the switching regulator will operate to maintain the input current at the current limit value. Similarly, an output current limit in a switching regulator may be an output current value. If the output current reaches a programmed output current limit value, then the switching regulator will operate to maintain the output current at the current limit value. Programmable input or output current limits (or both) may be used in either switching or linear regulator circuits, and may be programmed by storing digital bits (e.g., in a register or any type of volatile or nonvolatile storage). According to one embodiment, an initial current limit value is programmed and the input voltage from a power source is detected. The current limit may then be changed until a change in the input voltage is detected corresponding to the maximum current limit for the power source. The final current limit may be set to a level that optimizes the power available from the power source.

For example, in one embodiment a current limit is set to an initial level above the maximum current available from the power source. The system detects the voltage and may determine that the voltage is below an expected value or threshold value (e.g., below 5 volts for a 5 volt USB system). A lower than expected voltage may indicate that the power source is collapsing because the system is drawing more current than the power source can supply. If the voltage is below the expected value, the current limit may be decreased and the voltage monitored until the voltage increases to the expected value. For example, if the voltage is below an expected voltage, then the current limit may be reprogrammed by changing the stored value (e.g., in a register) to a lower current limit value. The system may then detect the voltage again. Accordingly, in this example the current limit may be incrementally decreased until the voltage on the input of the regulator increases to an expected input voltage value. Such a condition will mean that the current limit is set near the maximum available current from the power source.

Similarly, in another embodiment, a current limit is set to an initial level below the maximum current available from the power source. The system detects the voltage and may determine that the voltage is above an expected value or threshold value (e.g., above 4.8 volts for a 5 volt USB system). The input voltage being above an expected voltage may indicate that the power source is capable of providing more current. If the voltage is above the expected value, the current limit may be increased and the voltage monitored until the voltage decreases below the expected value, which may indicate that the power source is collapsing because the system is receiving more current than the power source can supply. For example, if the voltage is above an expected voltage, then the current limit may be reprogrammed by changing the stored value (e.g., in a register) to a higher current limit value. The system may then detect the voltage again. Accordingly, in this example the current limit may be incrementally increased until the voltage on the input of the regulator falls below an expected input voltage value. Such a condition will mean that the current limit exceeded the maximum available current. The current limit may then be reduced slightly to obtain the maximum current limit value for this power source. In an implementation using a programmable current limit, the programmed current limit value may be reduced to the immediately preceding value used before the voltage dropped below the expected voltage, which will be the maximum current limit setting. However, it is to be understood that the present invention may be implemented using either analog circuits as a continuous process or digital circuits as an incremental process.

Figure 2:
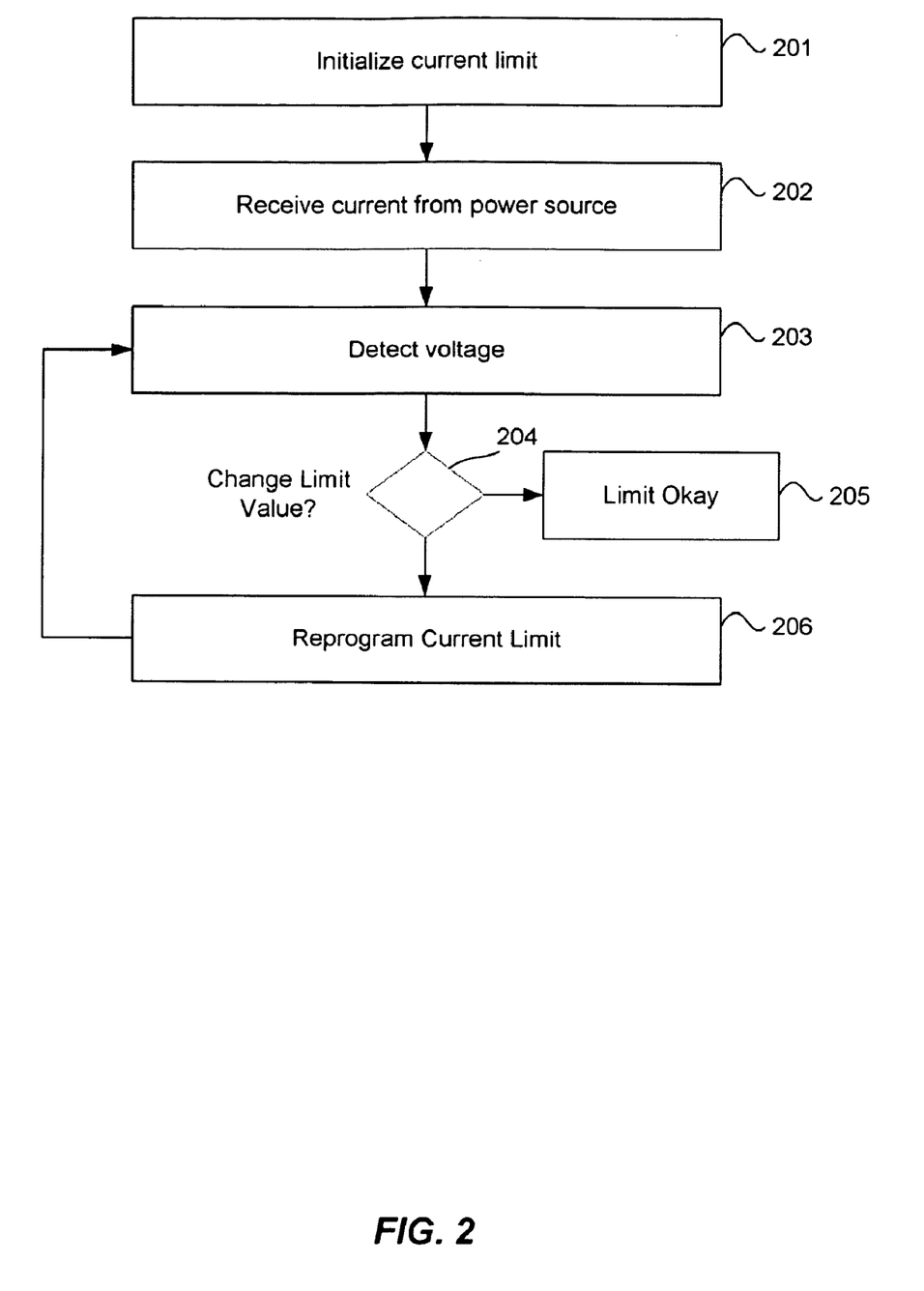
FIG. 2 illustrates a method of charging a battery, according to one embodiment of the present invention.

FIG. 2 illustrates a method of charging a battery according to one embodiment of the present invention. In this example, the current limit may be initialized at 201. As mentioned above, the current limit may be initialized above or below the expected final current limit value. At 202, current is received from the power source. For example, the regulator may operate to maintain a constant current or constant voltage at the output of the regulator, and a corresponding amount of current will be drawn from the power source. At 203, the voltage from the power source, which is the input voltage to the regulator, is detected. If the initial current limit value is above the maximum current available from the power source, then the input voltage will drop below an expected input voltage value and trigger a change (e.g., a decrease) in the current limit. Alternatively, in another embodiment, if the initial current limit value is set below the maximum current available from the power source, then the input voltage may be above an expected input voltage value and trigger a change (e.g., an increase) in the current limit. If a change is triggered, the current limit may be reprogrammed at 206, and the voltage detected again. The final current limit is obtained at 205.

Figure 3:
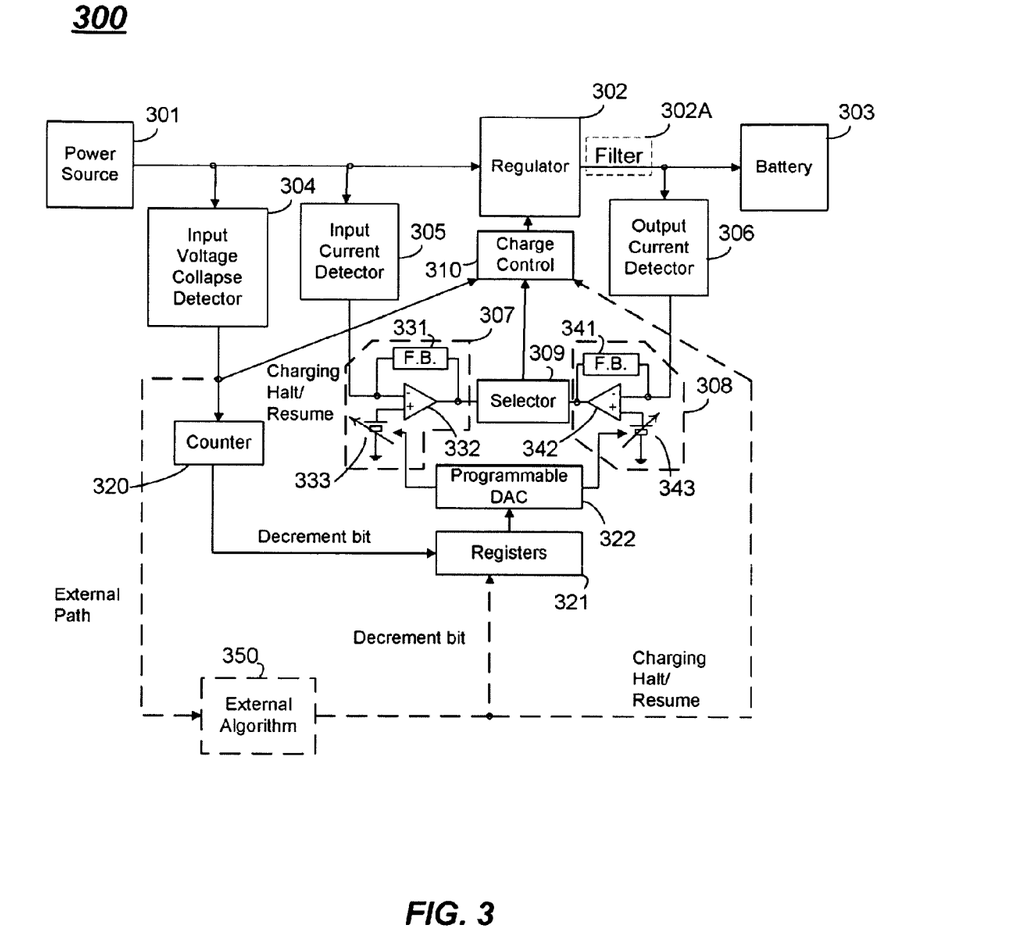
FIG. 3 illustrates an example of a battery charger circuit according to one embodiment of the present invention.

FIG. 3 illustrates an example of a battery charger circuit according to one embodiment of the present invention. Circuit 300 shows a power source 301 coupled to the input terminal of a regulator 302. The output terminal of regulator 302 is coupled to a battery 303. Circuit 300 includes an input voltage collapse detector 304, an input current detector 305, and an output current detector 306. The regulator may be a switching or linear regulator. Embodiments of the present invention may include input current limiting, output current limiting, or both. In this example, both input and output current detectors are shown. For example, input current detector 305 may be used to implement input current limiting and for determining the maximum power available from power source 301, and output current detector 306 may be used to control the charge current delivered to battery 303. Alternatively, output current detector 306 mat, be used to implement charge current control and for determining the maximum power available from power source 301. The following example illustrates an embodiment of the present invention using input current detector 305 to implement input current limiting, but it is to be understood that output current limiting could also be implemented in other embodiments.

Input current detector 305 detects the value of current being received from power source 301. For example, input current detector 305 may be a simple resistor for translating current into a voltage. More complex current detection techniques could also be used such as current mirrors, parallel transistors, or a variety of other techniques. In this example, current detector 305 outputs a voltage proportional to the current received from the power source 301. The voltage representing the input current from the power source is processed by a comparison circuit 307. For example, the voltage from current detector 305 may be compared to a reference voltage 333 using an amplifier 332. Amplifier 332 may be configured in a closed loop with feedback 331, for example. It is to be understood that comparators may also be used to perform the comparison function in other equivalent implementations. Here, reference voltage 333 is generated by a programmable digital-to-analog converter ("DAC") 322. The DAC is programmed with a value stored in registers 321. Accordingly, a value stored in registers 321 may be used to set the comparison voltage that is compared to the detected current value. If the input current from the power source increases such that the voltage at the input of amplifier 332 is greater than the programmed reference voltage 333, then the regulator may transition to input current controlled configuration. In this example, when the voltage corresponding to the input current increases above the programmed reference voltage, the output of amplifier 332 will transition from high to low. The transition of the output of amplifier 332 from high to low may in turn trigger selection circuit to control the regulator using the input current as the control value. Selection circuit may couple the output of amplifier 332 to the input of regulator 302 through controller 310, for example. Controller 310 may include an amplifier and reference voltage in a linear circuit or a PWM modulator in a switching circuit. In either case, the regulator will operate to maintain the input current at a value such that the voltage at the output of the input current detector is below the reference voltage from the DAC.

As mentioned above, the value used to program the DAC may be initially programmed so that the current limit is above an expected maximum input current value available from the power source, which may cause the input voltage to collapse. The value may then be incrementally decreased until the input voltage maintains its rated value. For example, an AC to DC wall adapter with a USB output may generate 5 volts DC and a maximum of up to 1500 mA. Accordingly, if an initial value is stored in registers 321 corresponding to an input current limit of 1800 mA, then the regulator may attempt to draw 1800 mA from the power source. However, if the regulator draws more the 1500 mA of current from the power source, the voltage on the power source will decrease as the power source's maximum current rating is exceeded. Input voltage collapse detector 304 detects the voltage received from the power source 301. In this example, detector 304 may be configured (e.g., programmed or hardwired) to detect an input voltage above 4.9 volts, for example. If the input voltage collapses, detector 304 may, generate a signal, which in turn may be used to reduce the input current limit value. In this example, the output of detector 304 is coupled to a counter 320. If the input voltage drops below the expected voltage (e.g., 4.9 volts), a signal from detector 304 may cause the counter 320 to be decremented. Additionally, the output of detector 304 may be coupled to a control circuit 310 to stop the regulator 302 if the input voltage collapses. The decremented bits may be stored in registers 321 and may correspond to an input current limit of 1700 mA. The voltage detector may be reset, for example, to determine if the input voltage is below the expected input voltage. In one embodiment, a delay, which may be programmable, is introduced between the time (or moment) the regulator is shut down and the time the regulator is restarted to allow the power source voltage to rise back up to its rated value (e.g., to recharge any capacitive loads on the power line). The regulator may be restarted and the input voltage detected. If the input voltage is still below the expected input voltage, counter 320 may again be decremented and the result used to reprogram registers 321 and DAC 322 to a value corresponding to 1600 mA, for example. This process may be repeated until a value is stored in registers 321 corresponding to a current limit value below the maximum current available from the power source. With this current limit, the input voltage from the power source will be above the expected value and the system may draw a current near the maximum amount of current available from the power source for charging battery 303 and/or powering up the device.

In one embodiment, an output current limit may be set to limit the input current received from the power source. For example, output current detector 306 may detect the output current and generate a voltage proportional to the current. The voltage representing the output current from the power source is processed by a comparison circuit 308. For example, the voltage from output current detector 306 may be compared to a reference voltage 343 using an amplifier 342. Amplifier 342 may be configured in a closed loop with feedback 341, for example. Reference voltage 343 is generated by DAC 322, which is illustrated as a single DAC, but may be implemented as two or more separate DACs. DAC 321 is programmed with a value stored in registers 321, which is also illustrated as a single block but may include multiple registers each including a plurality of data storage elements used to program multiple different circuits such as different DACs, for example. Accordingly, a value stored in registers 321 may be used to set the comparison voltage that is compared to the detected output current value. If the current from the regulator, which is derived from the power source current, increases such that the voltage at the input of amplifier 342 is greater than the programmed reference voltage 343, then the regulator may, be controlled by the output current. In this example, when the voltage corresponding to the output current increases above the programmed reference voltage, the output of amplifier 342 will transition from high to low. The transition of the output of amplifier 342 from high to low may in turn trigger selection circuit to control the regulator using the output current as the control value. Therefore, the regulator will operate to maintain the output current at a value such that the voltage corresponding to the output current detector is below the reference voltage from the DAC. By maintaining the output current below the programmed value, the input current can also be limited if the regulator is the primary point of current drawn from the power source for the system. As described above, the registers may be programmed with an output current limit value either above or below the maximum possible value for the power source, and the maximum output current limit can be obtained using input voltage detector 304 and iteratively reprogramming the output current limit as described above.

It is to be understood that in a switching regulator, the output current limit may be at a larger value than the input current when the battery voltage is lower than the input voltage from the power source. Accordingly, the output current limit may be set to higher values than the maximum input current from the power source while still maintaining the input current within its rated values. However, as the battery voltage increases, the output current limit may have to be reduced to maintain the input current within the ratings of the power source. Similarly, it is to be understood that in a linear regulator, the output current will typically be lower than the input current because of inefficiencies in the linear regulator.

In one example embodiment, an electronic circuit may include both input and output current limiting. For example, in a battery charging application, embodiments of the present invention may be used to charge a depleted battery. Initially, a battery ma, have a low voltage level corresponding to a depleted state. Accordingly, a regulator may be configured to generate a constant output current into the battery to recharge the battery. In this example, the output current may be set based on the maximum current that the battery can tolerate (e.g., based on a battery specification). However, when the voltage on the battery is low, the input current will be maintained at a low level based on the set output current. As the voltage on the battery increases from receiving a constant output current, the input current received by the regulator from the power source will begin to increase. If the input current increases above the maximum current available from the power source, the power supply voltage will collapse. Accordingly, during constant output current charging, the system continues to monitor power supply voltage, and if the input voltage from the power source drops below a threshold, the system re-programs the input current limit so that the input current drawn from the power source does not exceed a maximum value. In other words, when the regulator is in the charging phase (e.g., state 406 in FIG. 4 below) whenever the input collapses, the input current limit algorithm is re-initiated.

In the example described above, a counter 320 was coupled between the input voltage collapse detector 304 and registers 321 to iteratively change the programmed current limit value. The counter may decrement if the current limit is initially programmed higher than the maximum current available from the power source, or the counter may increment if the current limit is initially programmed lower than the maximum current available from the power source. In the later case, detector 304 malt generate a first output signal if the voltage on the input has not collapsed during a detection event, and detector 304 may generate a second output signal if the voltage on the input has collapsed during a detection event indicating the maximum current limit has been exceeded so that the system can reduce the current limit to the previous value. The two signals may be analog or digital signals with two states of a single line or different signals on multiple lines. All of the circuits described above may be implemented on a single integrated circuit, for example, for implementing the techniques described herein. In another embodiment, the output of input voltage collapse detector 304 may be coupled to external electronics. In this embodiment, external electronics may reprogram registers 321 based on an algorithm. For example, external electronics may, include a microprocessor, microcontroller, programmable logic, or a state machine circuit for controlling the electronic device. The algorithm may be implemented as software or firmware, or even as a hardwired state machine, for example. The output of detector 304 may generate one or more signals indicating that the power source voltage is below an expected value (e.g., the input voltage has collapsed) or that the power source voltage is above an expected value (e.g., the input voltage has collapsed) during a time period where detection is carried out, for example. The signals generated by detector 304 may be provided over an external path to other circuits executing an algorithm as shown at block 350. In response to receiving the signals from detector 304, the algorithm may cause the registers to be reprogrammed with new values to iteratively determine the optimum current limit. As shown in the example in FIG. 3, the algorithm block 350 may decrement the value in register 321 and generate halt and resume signals to controller 310 to turn off the regulator if the input voltage collapses and restart the regulator after the new current limit has been programmed.

Figure 4:
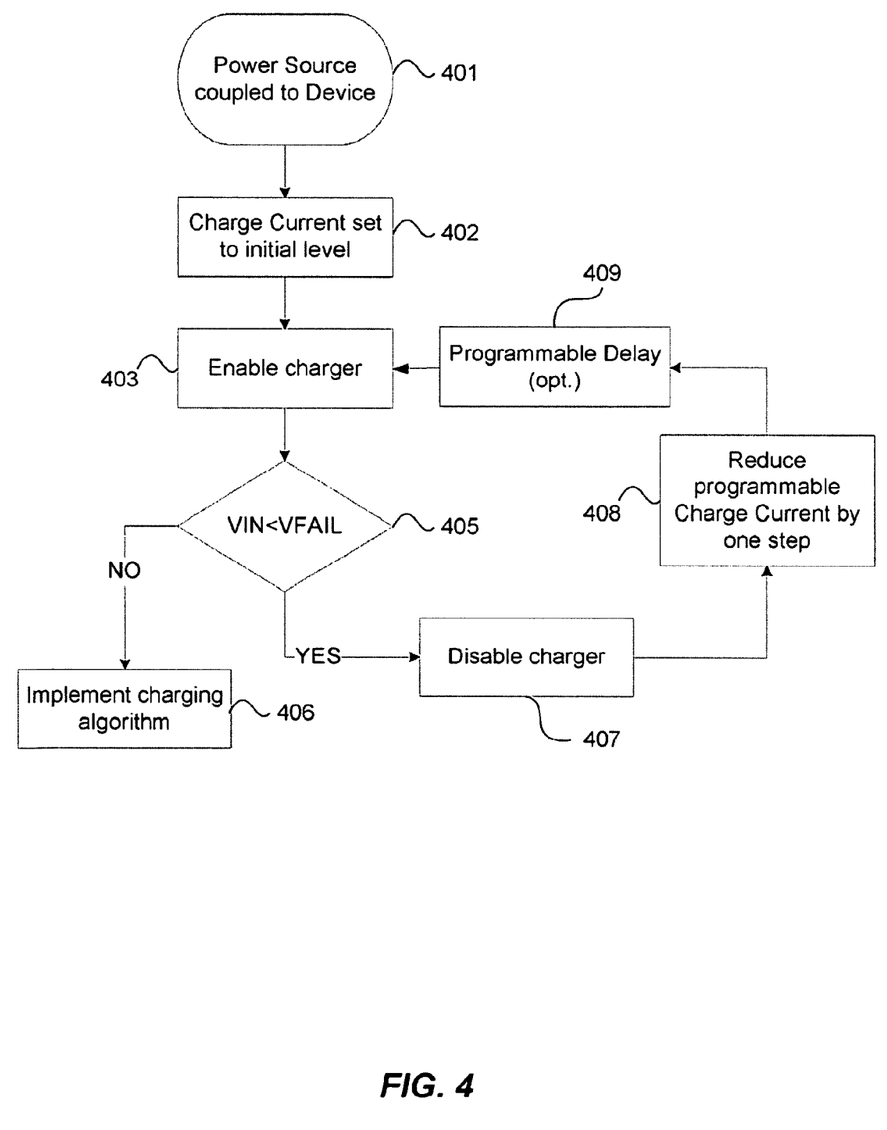
FIG. 4 illustrates a method of charging a battery according to one embodiment of the present invention.

FIG. 4 illustrates a method of charging a battery according to one embodiment of the present invention. This example process illustrates how the output current limit may be changed to maintain the current received from a power source within its rated values. At 401 the power source is coupled to the electronic device. At 402, the charge current into the battery, which is the output current of the regulator, may be set to an initial value. At 403, the battery charging circuit is enabled and the regulator begins to drive charge current into the battery. At 405, the input voltage is detected and compared to a threshold voltage. If the input voltage from the power source, Vin, is less than a threshold voltage, Vfail, at 405, then the charger is disabled at 407 and the charge current is reduced by one incremental step at 408. In one embodiment, a programmable delay may be included for controlling the time between the moment when the regulator is turned off and the moment when the regulator is turned on. This may be useful for different systems that may require different time periods for the power source input voltage to recover after a collapse. If the new charge current value does not collapse the input voltage when the charger restarted at 403, then Vin>Vfail at 405, and charging may continue at 406 using a variety of charging algorithms.

Figure 5:
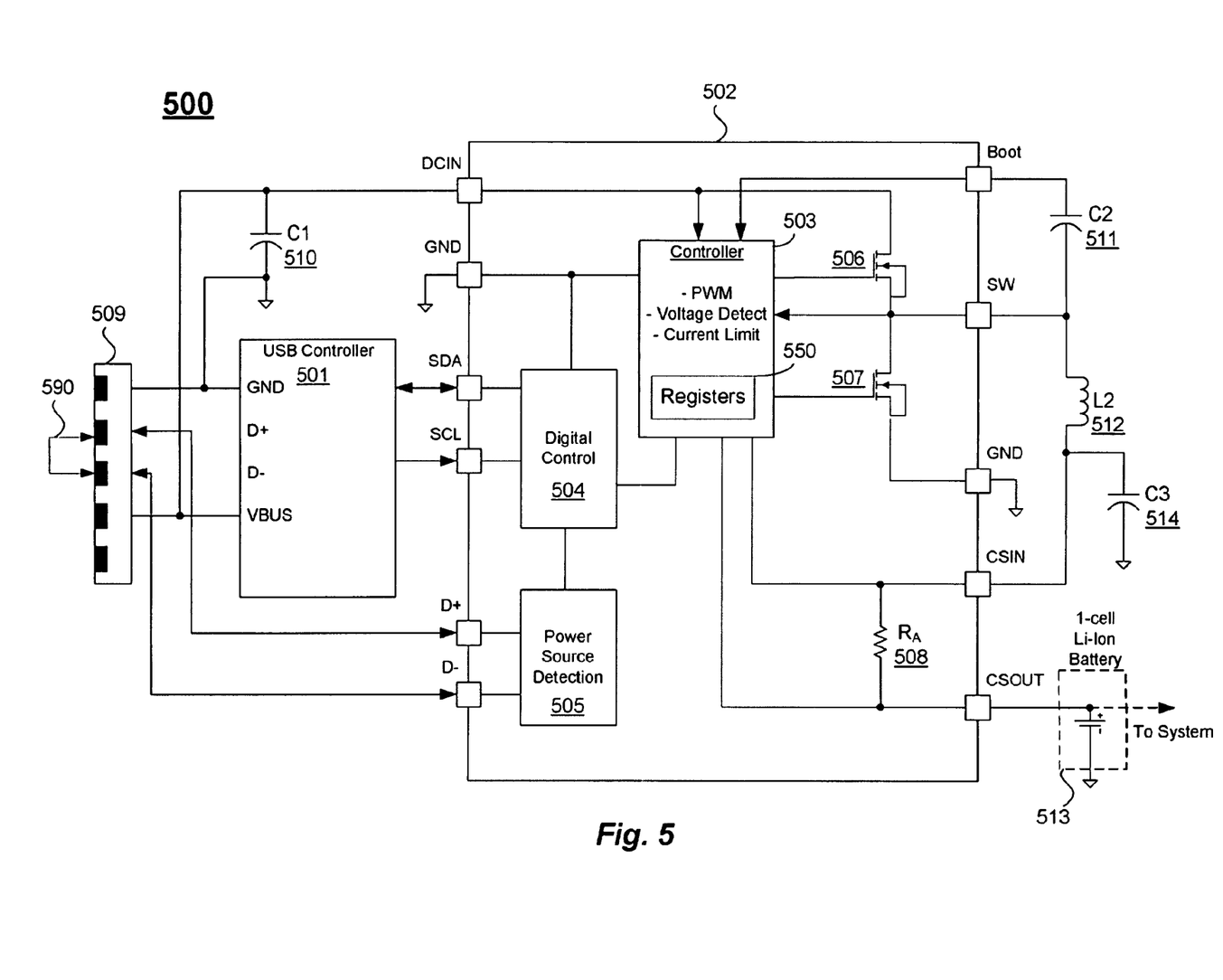
FIG. 5 illustrates a battery charger according to one embodiment of the present invention.

FIG. 5 illustrates a battery charger according to one embodiment of the present invention. This example illustrates an integrated circuit that may be included on an electronic device and used to charge a battery using the techniques described above. An electronic device 500 may include a USB socket 509 for receiving a USB cable. The USB cable may include a ground connection (GND), a DC voltage (VBUS), and two data lines (D+ and D−). Socket 509, therefore, includes a ground connection, input voltage connection, and two data connections. In some applications, an AC to DC wall adapter may provide a USB compatible output including the four above mentioned outputs. Since a wall adapter may not provide data outputs, the D+ and D− terminals may be connected together (i.e., short circuited) as illustrated by 590.

In this example, the electronic device may include a USB controller coupled to the USB socket for receiving VBUS, GND, D+, and D−. USB controller may couple data between integrated circuit 502 to a USB host or hub controller, for example. In this example, integrated circuit 502 includes an input terminal (e.g., a package pin DCIN) for receiving the power source voltage VBUS, with a DC capacitor 510 coupled between DCIN and ground. Integrated circuit 502 includes a controller 503 for implementing PWM switching regulation, input voltage detection, and programmable current limiting. Controller 503 may include registers 550 for storing one or more values of the current limit(s), for example. Integrated circuit 502 further includes digital pins SDA and SCL for communicating information with USB controller 501 for programming and configuring the integrated circuit. A digital controller 504 may receive information from USB controller 501 and configure registers or other data storage elements in the integrated circuit to program the circuit to perform the desired functions, including programming current limits and threshold voltages or expected power source input voltages, for example. In this example, digital controller 504 is coupled to a power source detection circuit 505. Power source detection circuit 505 is coupled to a D+ pin and a D− pin of the integrated circuit. The D+ pin may be coupled to the D+ connection on USB socket 509, and the D− pin may, be coupled to the D− connection of the USB socket. Power source detection circuit 505 may detect a short circuit between the D+ and D− USB lines as illustrated by 590, which may be used in wall adapters where no data is transmitted, for example. If a short circuit is detected, integrated circuit 502 may operate in a first charging mode by programming a plurality of registers with charging parameters corresponding to a wall adapter power source. If a short circuit is not detected (i.e., if an open circuit is detected), integrated circuit 502 may operate in a second charging mode by programming a plurality of registers with charging parameters corresponding to a USB power source. For example, in a USB power source mode, the system may be configured with charge parameters based on information communicated between a USB host or hub controller and the integrated circuit controller 504, for example.

In this example, the regulator is a switching regulator. Accordingly, integrated circuit 502 includes a first switching transistor 506 coupled between the DCIN pin and a switching output pin SW. A second switching transistor 507 may be coupled between the SW pin and a ground pin GND for establishing a ground connection. The gates of switching transistors 506 and 507 are coupled to the controller 503 for receiving PWM switching signals. The switching output pin is coupled to an inductor 512 and capacitor 514, which forms a filter. In this example, integrated circuit 502 further includes a current sense input pin CSIN coupled to the output of the filter. CSIN pin is coupled through a resistor 508 to a current sense output pin CSOUT. First and second terminals of resistor 508 are coupled to controller 503, and in accordance therewith, controller 503 may detect the output current of the regulator. CSOUT pin is coupled to battery 513, which in this example is a 1 cell lithium ion (Li-ion) battery, and to other system electronics of the electronic device. As illustrated in FIG. 4, the output current, which is also the charge current in this example, may be set to an initial value and the battery charge circuit enabled. The DCIN pin is coupled to controller 503, and controller 503 includes circuits for detecting the input voltage from the USB connector. If the initial charge current causes the input voltage to collapse, the circuit may be halted, and register 550 may be reprogrammed with a lower charge current. The system may be restarted and the USB input voltage detected again. This process may be repeated until the appropriate charge current is set.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, it is to be understood that some or all of the features, blocks, and components described above may be integrated on an integrated circuit. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method comprising:
receiving a voltage and a current in a regulator from an external power source to provide power to an electronic device, wherein the external power source has a maximum current and the voltage from the external power source collapses when the current from the external power source is above the maximum current; and
configuring a current limit circuit to limit current in the regulator to a plurality of current limit values and detecting, at the plurality of current limit values, if the voltage from the external power source collapses below a threshold voltage to find a maximum current limit value below the maximum current of the external power source.

2. The method of claim 1, the plurality of current limit values comprising an initial current limit value, one or more intermediate current limit values, and a final current limit value, said configuring the current limit circuit comprising:
configuring the current limit circuit to the initial current limit value;
detecting if the voltage from the external power source collapses below the threshold voltage at the initial current limit value;

reconfiguring the current limit circuit to the one or more intermediate current limit values and detecting, at each intermediate current limit value, if the voltage from the external power source collapses below the threshold voltage; and configuring the current limit circuit to the final current limit value below the maximum current of the external power source, wherein the final current limit value is said maximum current limit value.

3. The method of claim 2, wherein the initial current limit value is below the maximum current of the external power source, and wherein the one or more intermediate current limit values are incrementally increasing current limit values.

4. The method of claim 2, wherein the initial current limit value is above the maximum current of the external power source, and wherein the one or more intermediate current limit values are incrementally decreasing current limit values.

5. The method of claim 1, wherein said configuring and detecting are performed iteratively across the plurality of current limit values to find said maximum current limit value.

6. The method of claim 1, wherein the plurality of current limit values are configured across a plurality of equal increments.

7. The method of claim 1, said configuring and detecting comprising:
    configuring the current limit circuit to a first current limit value;
    detecting, at the first current limit value, if the voltage from the external power source collapses below the threshold voltage; and
    reconfiguring the current limit circuit to a plurality of increasing second current limit values, greater than the first current limit value, if the voltage from the external power source does not collapse below the threshold voltage at each current limit value, and reconfiguring the current limit circuit to an immediately preceding third current limit value if the voltage from the external power source collapse below the threshold voltage.

8. The method of claim 1, said configuring and detecting comprising:
    configuring the current limit circuit to a first current limit value;
    detecting, at the first current limit value, if the voltage from the external power source collapses below the threshold voltage; and
    reconfiguring the current limit circuit to a plurality of decreasing second current limit values, less than the first current limit value, if the voltage from the external power source collapses below the threshold voltage at each current limit value, wherein said maximum current limit value is a particular one of said plurality of decreasing second current limit values where the voltage from the external power source does not collapse below the threshold voltage.

9. The method of claim 1, wherein the current limit circuit is an output current limit circuit.

10. The method of claim 1, wherein the current limit circuit is an input current limit circuit.

11. The method of claim 1, wherein the regulator is switching regulator.

12. The method of claim 1, wherein the regulator is linear regulator.

13. The method of claim 1, wherein power is provided from said regulator to a battery in said electronic device.

14. The method of claim 1, wherein power is provided from said regulator to system electronics in said electronic device.

15. The method of claim 1, wherein power is provided from said regulator to a battery and system electronics in said electronic device.

16. The method of claim 1, wherein the external power source is a Universal Serial Bus power source.

17. The method of claim 1, wherein the external power source comprises an AC to DC converter.

18. The method of claim 1, wherein the plurality of current limit values are digitally programmable.

19. The method of claim 18, further comprising storing digital bits, wherein the plurality of current limit values are programmed by said stored digital bits.

20. The method of claim 19, wherein configuring the current limit circuit comprises changing digital bits stored in a register.

21. The method of claim 19, wherein the digital bits are stored in a volatile memory.

22. The method of claim 19, wherein the digital bits are stored in a non-volatile memory.

23. The method of claim 19, wherein the regulator, the current limit circuit, and the stored digital bits are on a single integrated circuit.

24. The method of claim 1, further comprising:
    detecting the current in the regulator from the external power source;
    generating a first voltage proportional to said current; and
    controlling the regulator to maintain said first voltage below a reference voltage.

25. The method of claim 24, further comprising generating the reference voltage from a digital-to-analog converter.

26. The method of claim 25, further comprising receiving digital bits at an input of the digital-to-analog converter to configure said current limit circuit.

27. The method of claim 26, wherein if the voltage from the external power source collapses below the threshold voltage at one of the plurality of current limit values, then the digital bits are changed to lower the current limit value.

28. The method of claim 1, further comprising shutting down the regulator if the voltage from the external power source collapses below the threshold voltage and restarting the regulator after a time period.

29. A circuit comprising:
    a regulator, the regulator having in input to receive voltage and current from an external power source and an output to provide power to an electronic device, wherein the external power source has a maximum current and the voltage from the external power source collapses when the current from the external power source is above the maximum current;
    an input voltage detection circuit having an input to receive the voltage from the external power source and detect when the voltage from the external power source collapses below a threshold voltage; and
    a current limit circuit to limit current in the regulator;
    wherein the current limit circuit is reconfigured to a plurality of current limit values and the input voltage detection circuit detects if the voltage from the external power source collapses below the threshold voltage at the plurality of current limit values to find a maximum current limit value below the maximum current of the external power source.

30. The circuit of claim 29, the regulator comprising a transistor having a first terminal coupled to the external power source, a control terminal to receive a control signal, and a second terminal coupled to the output of the regulator.

31. The circuit of claim 29, the current limit circuit comprising:

a current detector to generate a first voltage proportional to said current; and a comparison circuit to compare the first voltage to a reference voltage.

32. The circuit of claim 29, further comprising a digital-to-analog converter coupled to the current limit circuit to translate a plurality of digital bits into the plurality of current limit values.

33. The circuit of claim 29, the plurality of current limit values comprising an initial current limit value, one or more intermediate current limit values, and a final current limit value, wherein reconfiguring the current limit circuit comprises:

configuring the current limit circuit to the initial current limit value;

detecting if the voltage from the external power source collapses below the threshold voltage at the initial current limit value;

reconfiguring the current limit circuit to the one or more intermediate current limit values and detecting, at each intermediate current limit value, if the voltage from the external power source collapses below the threshold voltage; and configuring the current limit circuit to the final current limit value below the maximum current of the external power source, wherein the final current limit value is said maximum current limit value.

34. The circuit of claim 33, wherein the initial current limit value is below the maximum current of the external power source, and wherein the one or more intermediate current limit values are incrementally increasing current limit values.

35. The circuit of claim 33, wherein the initial current limit value is above the maximum current of the external power source, and wherein the one or more intermediate current limit values are incrementally decreasing current limit values.

36. The circuit of claim 29, wherein the regulator, the input voltage detection circuit, and the current limit circuit are integrated on a single integrated circuit.

37. The circuit of claim 29, wherein the regulator is shut down if the voltage from the external power source collapses below the threshold voltage, and the regulator is restarted after a time period.

38. A circuit comprising:

a regulator, the regulator having in input to receive voltage and current from an external power source and an output to provide power to an electronic device, wherein the external power source has a maximum current and the voltage from the external power source collapses when the current from the external power source is above the maximum current;

a current limit circuit for limiting current in the regulator;

means for configuring the current limit circuit to a plurality of current limit values; and means for detecting, at the plurality of current limit values, if the voltage from the external power source collapses below a threshold voltage to find a maximum current limit value below the maximum current of the external power source.

* * * * *